United States Patent
Appleton et al.

(10) Patent No.: US 6,628,621 B1
(45) Date of Patent: Sep. 30, 2003

(54) MULTICHANNEL-CAPABLE BIT ERROR RATE TEST SYSTEM

(75) Inventors: Robert Scott Appleton, Madison, AL (US); Andrew L. Plankenhorn, Hazel Green, AL (US); Paul E. Calvert, Lacey's Spring, AL (US); Steven Creg Killen, Madison, AL (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/432,707

(22) Filed: Nov. 2, 1999

(51) Int. Cl.[7] ............................... H04J 1/16; H04J 3/14
(52) U.S. Cl. ...................... 370/249; 370/241; 370/250; 370/251; 714/715; 714/716; 379/27.01; 379/27.03; 379/27.04; 379/27.05
(58) Field of Search ................................. 370/241, 249, 370/250, 251, 352, 524; 714/715, 716, 46, 703, 712; 709/250; 379/1.01, 10.01, 12, 26.01, 27.01, 27.03, 27.04, 29.05, 136, 143

(56) References Cited

U.S. PATENT DOCUMENTS

| | | | | | |
|---|---|---|---|---|---|
| 3,956,601 A | * | 5/1976 | Harris et al. | ................ | 714/715 |
| 5,121,342 A | | 6/1992 | Szymborski et al. | ........ | 364/514 |
| 5,351,232 A | * | 9/1994 | Yamashita | .................. | 370/248 |
| 5,553,059 A | * | 9/1996 | Emerson et al. | ............ | 370/249 |
| 5,771,236 A | * | 6/1998 | Sansom et al. | ............. | 370/458 |
| 5,805,571 A | * | 9/1998 | Zwan et al. | ................ | 370/249 |
| 5,991,270 A | * | 11/1999 | Zwan et al. | ................ | 370/249 |
| 6,108,801 A | * | 8/2000 | Malhotra et al. | ........... | 714/715 |
| 6,216,170 B1 | * | 4/2001 | Giovannoni et al. | ........ | 709/250 |
| 6,356,556 B1 | * | 3/2002 | Toth et al. | .................. | 370/524 |
| 6,385,236 B1 | * | 5/2002 | Chen | .......................... | 370/249 |
| 6,560,727 B1 | * | 5/2003 | Pierson et al. | ............. | 714/704 |

* cited by examiner

Primary Examiner—Wellington Chin
Assistant Examiner—Chuong Ho
(74) Attorney, Agent, or Firm—Allen, Dyer, Doppelt, Milbrath & Gilchrist, P.A.

(57) ABSTRACT

A bit error rate test (BERT) system is configured as a field programmable gate array that emulates multiple independent BERT generators. The BERT generators produce test frames containing test pattern codes associated with respectively different time division multiplexed (TDM) digital communication channels, that are not necessarily mutually contiguous within a plurality of TDM timeslots of a network communication frame serving digital communication circuits. A framing unit assembles the test code patterns into a test frame and transmits the test frame over a serial network interface to a plurality of digital channel units of a channel bank. The framing unit also interfaces contents of test code patterns within test frames returned from the channel units over the serial network interface with a plurality of data channel-specific virtual BERT receivers, associated with respective digital communication channels. A bit error processor determines errors in the contents of the test code patterns within returned test frames.

19 Claims, 5 Drawing Sheets

| DS0 1 | DS0 2 | DS0 3 | DS0 4 | DS0 5 | DS0 6 | DS0 7 | DS0 8 | ... | DS0 21 | DS0 22 | DS0 23 | DS0 24 | F-BIT |
|---|---|---|---|---|---|---|---|---|---|---|---|---|---|
| XXXXXXX | XXXXXXX | XXXXXXX | XXXXXXX | XXXXXXX | XXXXXXX | XXXXXXX | XXXXXXX | ... | XXXXXXX | XXXXXXX | XXXXXXX | XXXXXXX | * |

FIG. 1
(PRIOR ART)

| DS0 1 | DS0 2 | DS0 3 | DS0 4 | DS0 5 | DS0 6 | DS0 7 | DS0 8 | ... | DS0 21 | DS0 22 | DS0 23 | DS0 24 | F-BIT |
|---|---|---|---|---|---|---|---|---|---|---|---|---|---|
| DSL 1 B1 | DSL 1 B2 | DSL 1 D&M | DSL 2 B1 | DSL 2 B2 | DSL 2 D&M | DSL 3 B1 | DSL 3 B2 | ... | DSL 7 D&M | DSL 8 B1 | DSL 8 B2 | DSL 8 D&M | * |

| DS0 1 | DS0 2 | DS0 3 | DS0 4 | DS0 5 | DS0 6 | DS0 7 | DS0 8 | DS0 21 | DS0 22 | DS0 23 | DS0 24 | F-BIT |
|---|---|---|---|---|---|---|---|---|---|---|---|---|
| DSL 1-10 MAINTENANCE CHANNEL BITS | DSL 1-10 D-CHANNEL BITS | | | DSL 1 B1 | DSL 1 B2 | DSL 2 B1 | DSL 2 B2 | DSL 9 B1 | DSL 9 B1 | DSL 10 B1 | DSL 10 B2 | * |

MULTICHANNEL-CAPABLE BIT ERROR RATE TEST SYSTEM

FIELD OF THE INVENTION

The present invention relates in general to communication systems, and is particularly directed to a bit error rate test (BERT) system, that is programmably configurable to emulate one or more independent BERT generators and thereby produce a sequence of test frames. The test frames contain test pattern codes associated with respectively different time division multiplexed (TDM) digital communication channels that are not necessarily mutually contiguous within a plurality of TDM timeslots of a network communication frame serving digital communication circuits. The programmable BERT system of the invention is operative to selectively interface the sequence of test frames with digital communication units of a channel bank over a serial network interface and to measure thereover the performance of the digital communication units.

BACKGROUND OF THE INVENTION

Figure 1:
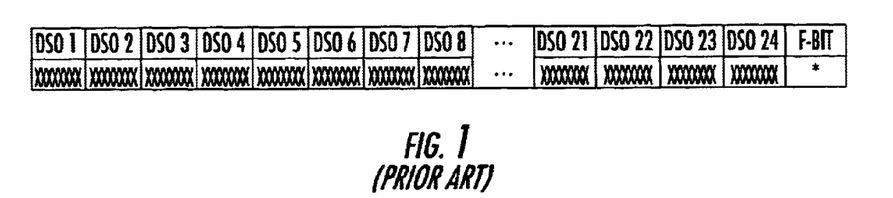
FIG. 1 shows a standard T1 frame 'channelized' into twenty-four basic rate (DS0) channels of eight bits each.
Figure 2:
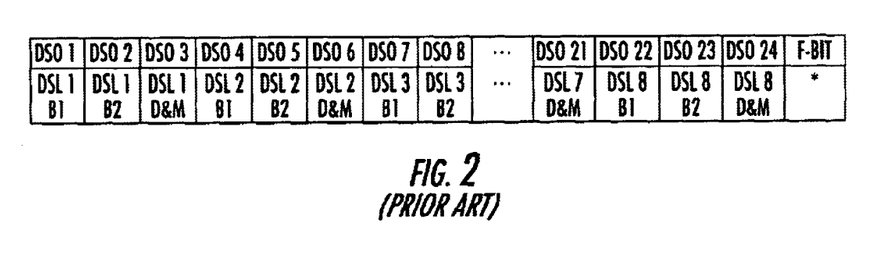
FIG. 2 shows the DS0 time slots of ISDN channels of a standard T1 frame grouped in pairs of B1 and B2 bearer channels of eight bits each, and auxiliary (D and M) control channels associated with each pair of bearer channels.

The parameters of signals generated by digital communication equipments that interface with existing telecommunication networks are required to conform with prescribed industry (e.g., ANSI) standards. For example, a standard T1 data frame (having a data transport rate of 1.544 Mbps) contains 193 bits, including a framing bit and 192 channel bits. The channel bits may be undivided (non-channelized), or may be 'channelized', by being subdivided into one or more timeslots or channels of some number of bits per channel, such as twenty-four basic rate (DS0) channels of eight bits each, as diagrammatically illustrated in FIG. 1. As shown in FIG. 2, when employed for the transport of integrated services digital network (ISDN) channels, these twenty-four basic rate DS0 channels (DS0-0, . . . , DS0-23) may be grouped in pairs of B1 and B2 bearer channels of eight bits each, and auxiliary (D and M) control channels associated with each pair of bearer channels.

A conventional (non-channelized) T1 BERT device typically generates a single stream of 192 bits that are is inserted sequentially across the entire frame of data. As long as the T1 circuit under test is non-channelized, such as a high data rate digital subscriber line (HDSL) or a fractional T1 loop, this standard T1 BERT device may be used, since all of the bits transmitted over the T1 interface are delivered to only one circuit under test and therefore will be returned from that circuit in the order transmitted. However, if the T1 circuit to be tested is channelized, such as one that is subdivided into channel units of a multi-unit channel bank, diagrammatically illustrated at 10 in FIG. 3, a conventional BERT device 12 cannot be used to test the circuit via the T1 network interface 14, since the channels of the channel units 16 of the channel bank 10 cannot be assumed to be 'time sequence synchronous'.

Figure 3:
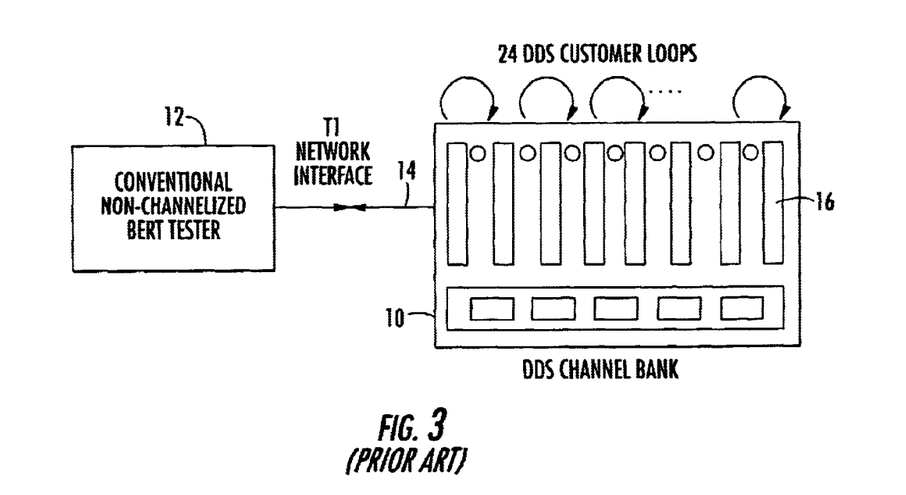
FIG. 3 diagrammatically illustrates a conventional BERT device coupled over a T1 interface with a multi-unit channel bank.
Figure 4:
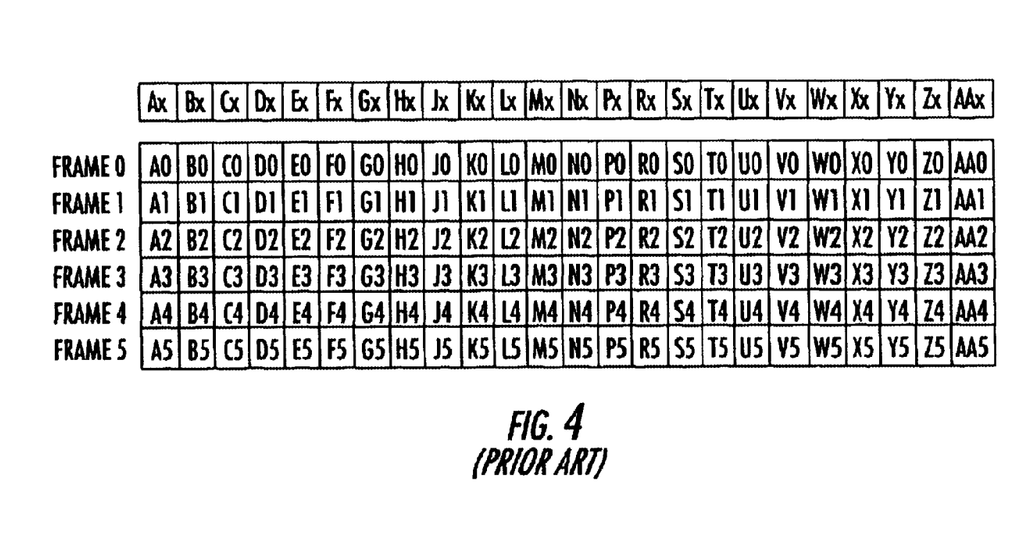
FIG. 4 shows a series of T1 test frames as asserted onto the T1 network interface of FIG. 3 by a conventional non-channelized BERT device.

More particularly, FIG. 4 shows a series of T1 test frames Frame 0, Frame 1, Frame 2, . . . , each of which is comprised of a sequence of twenty-four test pattern codes Ax, Bx, . . . AAx (where x is the-frame number), as asserted onto the T1 network interface 14 by the conventional non-channelized BERT device 12. Each channel unit 16 in the channel bank 10 transmits its (single) associated byte in a respective test frame received from the BERT out its transmit port, which is then immediately looped back to its receive port, and returned over the T1 network interface to the BERT device.

Figure 5:
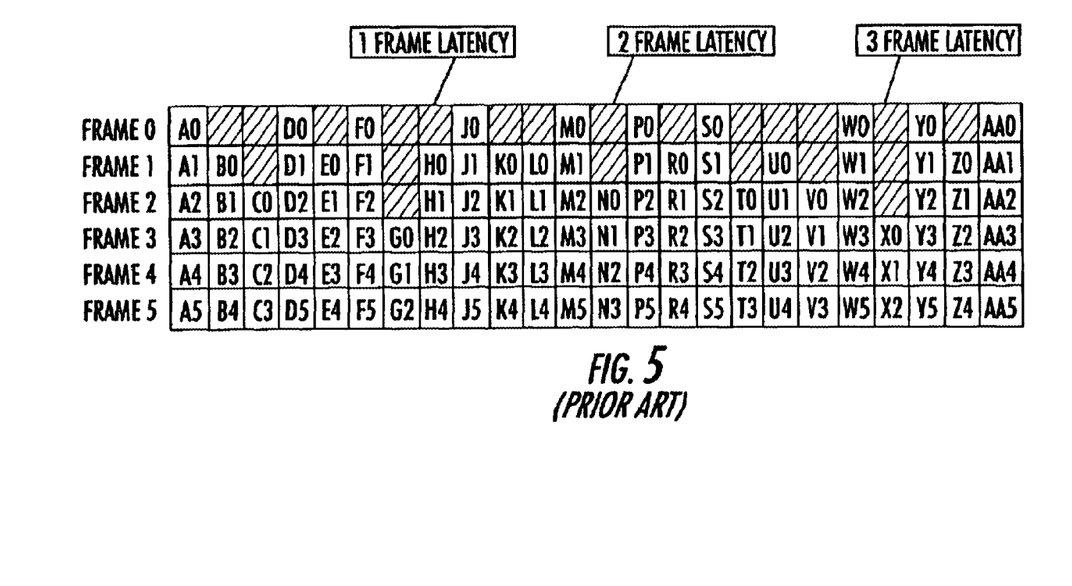
FIG. 5 shows test frames returned to the BERT device in the network of FIG. 3 in which bytes from some DS0s are shifted in time.

In an ideal world, each channel unit operates with zero latency, so that the bits of each successive test frame sourced from the BERT device will be received in exactly the same order as they are transmitted, enabling test frame pattern sync to be readily achieved in the BERT device's receiver. In the real world, however, the respective channel units of the channel bank 10 exhibit different degrees of latency. As a consequence, frames returned to the BERT device have bytes from some DS0s that are shifted in time, as shown diagrammatically in the non-limiting test frame sequence example of FIG. 5. This means that the frames returned from the channel bank will not match the transmitted test frames, preventing the BERT device from achieving pattern sync.

Figure 6:
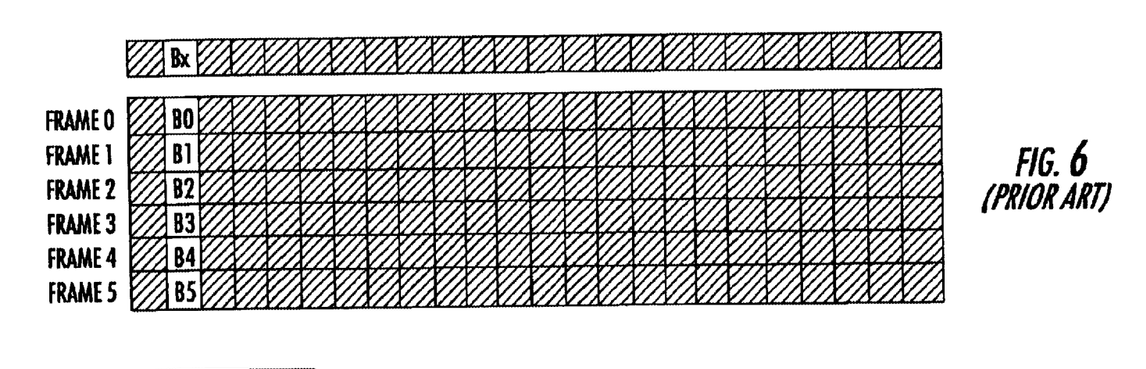
FIG. 6 shows the individual testing of only one of a channel bank's twenty-four channel units, wherein each test frame of a test frame sequence contains only a single test code associated with only a single selected DS0 timeslot.
Figure 7:
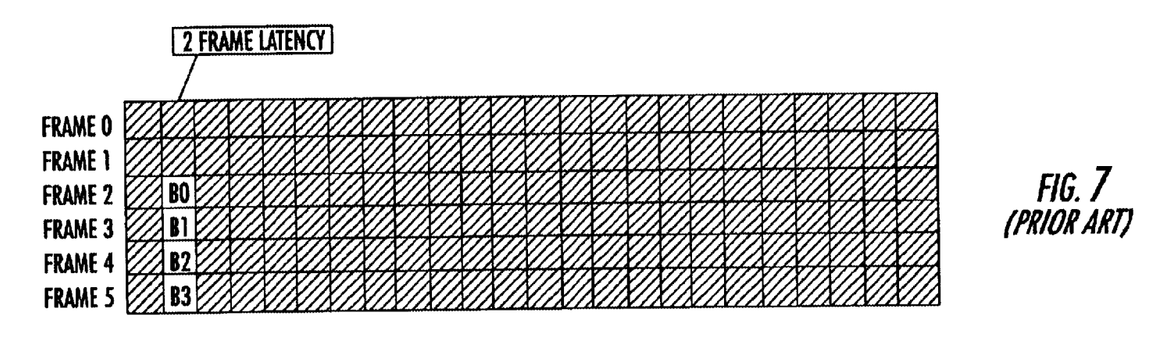
FIG. 7 shows the example of a channel unit under test returning transmitted test frames with a two frame latency.

To test a channelized T1 network, therefore, a channelized BERT device, namely, one which is operative to test one channel at a time, must be employed. This individual testing of only one of the bank's (twenty-four) channel units is shown diagrammatically in FIG. 6, wherein each test frame of the test frame sequence Frame 0, Frame 1, Frame 2, . . . contains only a single test code (B0, B1, B2, . . . ) associated with only a single selected channel (timeslot DS0-1). As further shown in FIG. 7, although the channel unit under test returns the transmitted test frames with a two frame latency, that delay poses no problem, since the bytes of the returned test pattern frames are received in exactly the same order as they are transmitted. However, a major shortcoming in testing channelized networks in this manner is the considerable time required to test all of the channels.

Figure 8:
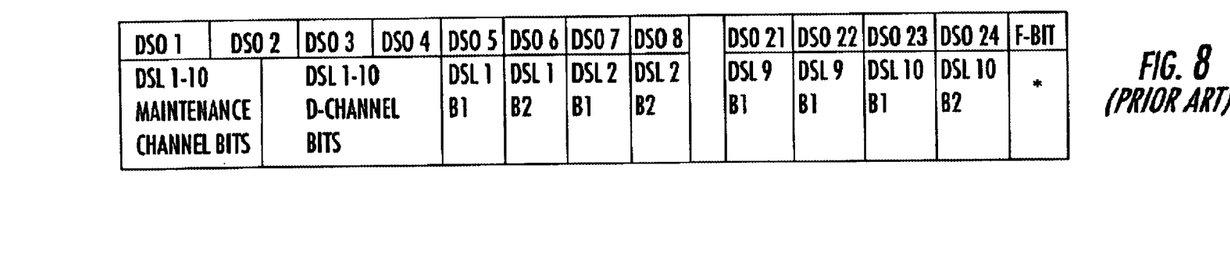
FIG. 8 shows a frame of BR1/10 bits of a ten channel ISDN frame.
Figure 9:
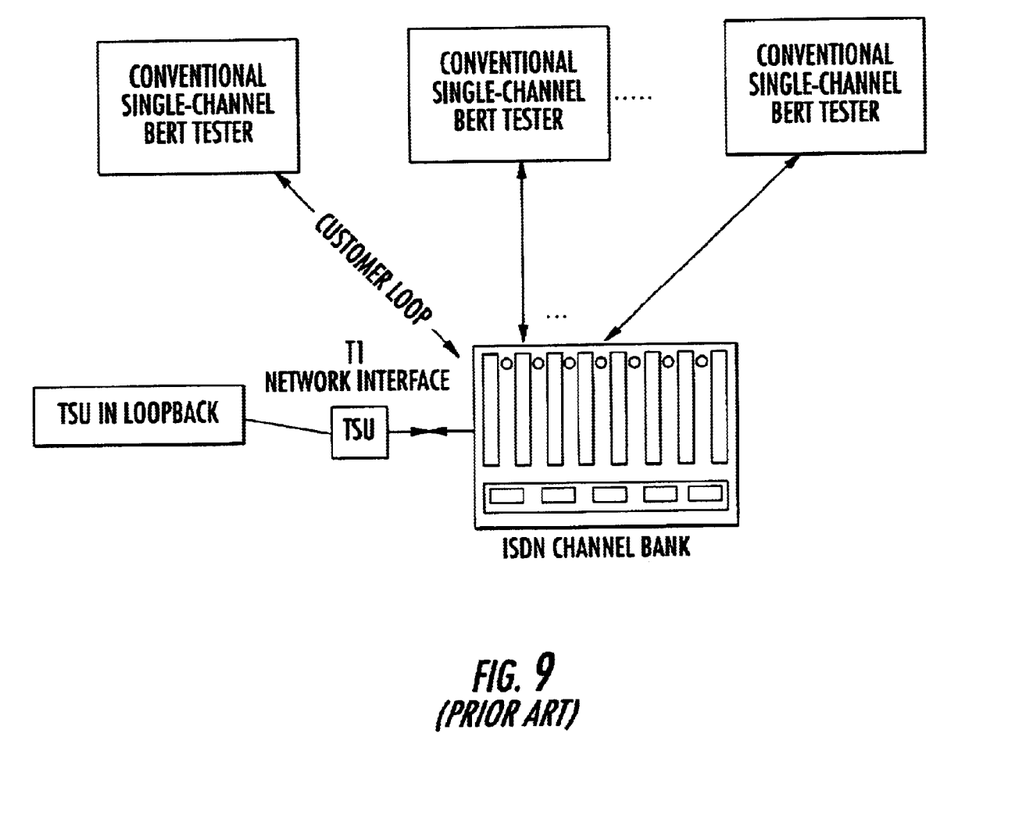
FIG. 9 diagrammatically illustrates the use of separate conventional BERT devices to test each channel of an ISDN channelized frame.

In addition to being unable to test a 'channelized' network, a conventional BERT device is also unable to test non-contiguous and non-adjacent channels, such as a frame of basic rate 3-DS0 ISDN channels, shown diagrammatically in FIG. 2 referenced above, or the frame of BR1/10 bits of a ten channel ISDN frame shown in FIG. 8, and described in U.S. Pat. No. 5,771,236, issued Jun. 23, 1998 to Sansom et al (hereinafter referred to as the '236 patent), entitled "Method for Increasing ISDN Channel Capacity of TDM Serial Communication Link for Digital Subscriber Line Channels," assigned to the assignee of the present application and the disclosure of which is incorporated herein. The main problem in testing a non-adjacent channel configured ISDN frame is the fact that the (D/M) data within the auxiliary control channels is no longer contiguous with that in the adjacent bearer channels, due to the presence of interleaved bits. A conventional BERT device cannot 'skip'bits. Similarly, the D channels of a BR1/10 ISDN frame occupy multiple DS0 channels that are non-contiguous with their associated bearer channels. Since the data within a channel is no longer contiguous, and is not transferred across adjacent DS0s, a conventional BERT device cannot be used to test across the network interface. Instead, as diagrammatically illustrated in FIG. 9, a separate single channel BERT device is required to test each channel, increasing the number and cost of system resources.

SUMMARY OF THE INVENTION

In accordance with the present invention, the shortcomings of conventional BERT schemes, such as those described above, are effectively obviated by a new and improved bit error rate test system that is programmably configurable to emulate one or more independent BERT generators that generate channel pattern test codes for testing one or more channels of a telecommunication channel bank. In effect, the channel pattern test codes generated by the programmably configurable BERT generator of the present invention may be considered to be 'pseudo'subscriber channels—conveying test pattern codes, as the effective functionality of the output codes generated by the BERT generator is to test the channels, rather than deliver information signals via the channels to circuits served by associated channel units.

For this purpose, a data channel-specific BERT generator unit is programmed to implement one or more individual BERT pattern generators, depending upon the type or format of channelization of the circuits under test. Each BERT pattern generator generates a respective test code pattern that is used to form successive test frames for testing one or more data channels. The BERT test patterns are coupled to a data channel-specific network test frame buffer, which is programmably configurable under software control to provide plural channel registers that store an entire test frame for transmission to the channel circuits or units under test.

The input/output addressing scheme for the test frame buffer is programmed to logically map grouped data channel bits into physical bit positions within an outgoing test frame. Although the bits stored in the registers of the frame buffer have a one-to-one relationship with the bits in the outgoing network test frame, the data channels need not be in any specific order within the network test frame buffer. The test pattern codes stored in the sub-channel registers of the test frame buffer are controllably assembled into a test frame by a data channel-specific control logic unit, which controls the placing of a test data channel generated by the BERT generator unit into the network frame buffer as well as its extraction from a bit stream returned from the network. The contents of the data channel-specific registers of the network frame buffer are serially clocked through a transmit shift register into an external network framer under the control of a transmit data channel controller. Transmission frame synchronization is controlled from the external network framer.

On the receive side of the network interface, the incoming network signal is converted into a serial bit stream and, along with a received frame synchronization signal used to identify the beginning of the frame, is fed by the external framer into a receive shift register. The contents of the receive shift register are selectively demultiplexed into a data channel-specific virtual receiver array that is programmed to implement one or more pattern receivers, depending on the number of sub-channels within the data channel, and functions as a virtual array of independent BERT receivers, one per data channel.

A receive data channel controller monitors the reassembly of the recovered sub-channels out of the received serial bit stream and controls the assembly of sub-channels from the incoming serial bit stream, the processing of these bits through the virtual receiver array, and the storing of error counts and state information in memory. The receive data channel controller essentially operates as a counter that counts from one up to the number of data channels present within the frame. It receives its timing from the external framer, so that it can properly extract data from each network frame.

When all the bits of a particular channel are available, the data channel-specific BERT receiver recalls state information stored in a data channel memory for the data channel being processed. To check for bit errors in the frame sequence, the data channel bits stored in the BERT receiver registers are fed serially into associated pattern comparators and compared with the test pattern codes produced by the transmit BERT generator. Any bit errors are accumulated in associated registers of the memory under the control of the receive data channel controller as the processing of each data channel is completed. Once all the bits of a respective data channel have been processed, the state of that channel is saved in its associated state memory. The cycle repeats for the next data channel until all data channels within the frame have been processed.

DETAILED DESCRIPTION

Before detailing the architecture and operation of the programmable multichannel-capable bit error rate test system of the present invention, it should be observed that the invention resides primarily in an arrangement of conventional communication circuits and associated digital signal processing components and attendant supervisory control circuitry therefor, that controls the operations of such circuits and components. The configuration of such circuits components and the manner in which they interface with other communication system equipment have, therefore, been illustrated in readily understandable block diagram format, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 10:
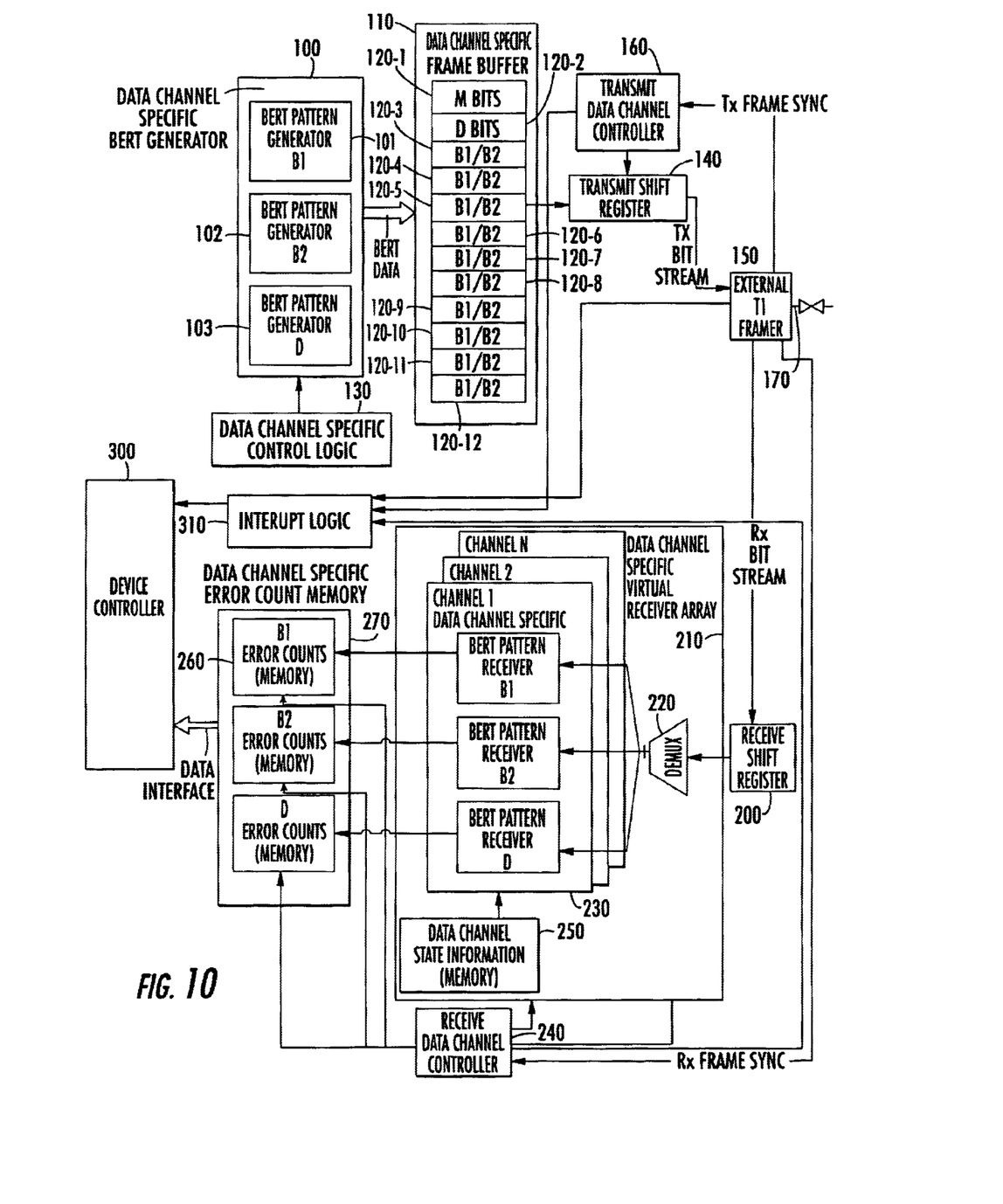
FIG. 10 diagrammatically illustrates the architecture of a programmable multichannel-capable bit error rate test system in accordance with the present invention, configured to test BR1/10 ISDN channelization.

The architecture of the programmable multi-channel bit error rate test system of the present invention is diagrammatically illustrated in FIG. 10 for the non-limiting example of testing BR1/10 ISDN channelization as described in the above-referenced '236 patent. However, as pointed out above, the BERT system of the present invention is not limited to use with this or any other channelization format; it is readily employable with substantially any type of TDM-based fractional or channelized network, and its application to fractional and sub-channel examples will be described. Moreover, although the present description is for a T1 network, it is also applicable for use with other data rates, such as an E1 network.

For purposes of the present description, a channel is defined as a logical grouping of data bits; it may be atomic, or it may be comprised of two or more sub-channels. For example, an atomic grouping of data bits may contain a single, fractional data channel that occupies a prescribed portion (up to the entirety) of a network (e.g., T1) data frame. Non-limiting sub-channel examples include those discussed above, such as digital dataphone services (DDS) channels containing primary and secondary sub-channels, and ISDN data channels containing two bearer (B1, B2) sub-channels and a data (D) sub-channel. Data channels need not be contiguous and do not necessarily map directly into DS0 timeslots of a network frame.

As shown in FIG. 10, the multichannel BERT system includes a data channel-specific BERT generator unit 100, that contains one or more individual BERT pattern generators, depending upon the type of channelization (or lack thereof) of the circuit under test. In accordance with a preferred, but non-limiting embodiment, substantially the entirety of the BERT system of the invention is implemented as a field programmable gate array (FPGA), so that the BERT generator unit 100 may be programmed (and reprogrammed, as desired) to emulate one or more independent BERT pattern generators, each of which generates a respective test code pattern that is used to form successive test frames for testing one or more data channels. These test pattern generators produce verifiable bit streams (e.g., 2047 or 511 test patterns) on a frame-by-frame basis.

Thus, in order to emulate a fractional channel BERT generator, the FPGA may be programmed to produce a single stream of test pattern bits that fills an entire T1 network frame. For testing a DDS channelization circuit, the BERT generator unit may be programmed to produce two independent test patterns, one of which is used to test the primary sub-channel, and the other of which is used to test the secondary sub-channel. In particular, successive six-bit or seven-bit groups or 'chunks' of bits are generated for each primary sub-channel and one-bit chunks are generated for each secondary sub-channel per frame.

For the non-limiting example of the ISDN channelization shown in FIG. 10, the BERT generator unit's FPGA 100 is programmed to emulate three independent test pattern generators 101, 102 and 103. The first sub-channel BERT generator 101 generates eight-bit test pattern codes that are used to test the B1 bearer sub-channel; the second sub-channel BERT generator 102 generates eight-bit test pattern codes that are used to test the B2 subchannel; and the third sub-channel BERT generator 103 generates two-bit test pattern codes that are used to test the D sub-channel.

The BERT test patterns produced by the FPGA 100 are coupled to a data channel-specific network test frame buffer 110. The test frame buffer 110 is programmably configurable under software control to store an entire test frame for transmission to the channel unit(s) under test. The input/output addressing scheme for the test frame buffer 110 is programmed so as to map logically grouped data channel bits into physical bit positions within an outgoing test frame. For the illustrated example of testing ISDN channels, the network frame buffer 110 contains a plurality of data channel-specific registers 120, each of which receives a "chunk" or group of bits within the BERT test pattern from the FPGA 100 at the beginning of every test frame.

The bits stored in the registers 120 of the frame buffer 110 have a one-to-one relationship with the bits in the outgoing network test frame; however, it is not required that the data channels be in any specific order within the network test frame buffer 110. As pointed out above, the translation of data channel bits to frame buffer bits is programmable, so as to enable the network test frame buffer to be used for widely differing channelization schemes. The result is to take a group of bits known collectively as a data channel and latch them into a specific order within an outgoing test frame. The bit order within the transmitted test frame does not necessarily match the bit order within the data channel.

The number of data channels of a network tested by the BERT generator is not limited. The output stream from the BERT generator 100 is replicated as many times as necessary to fill all the data channels within the network frame buffer 110. Additional levels of buffering can be incorporated to displace adjacent data channels in time (for example, channel 'n'can be made to run two frames ahead of channel 'n+1'). This is useful to prevent certain patterns (e.g., a eight consecutive zeros) from being replicated throughout the frame, which can be interpreted as error conditions.

As pointed out above, the channel pattern codes generated by the programmably configurable BERT generator of the present invention may be considered to be 'pseudo' subscriber channels conveying test pattern codes, as the effective functionality of the output codes generated by the BERT generator is to test the channels, rather than deliver information signals via the channels to the circuits served by their associated channel units.

For the BR1/10 ISDN channelization scheme illustrated in FIG. 10, a data sub-channel register 120-1 stores maintenance (M) channel bits, a data sub-channel register 120-2 stores data (D) channel bits, and bearer sub-channel registers 120-3, . . . , 120-12 store respective pairs of B1/B2 bearer channel test bytes for the ten ISDN channels under test. The contents of the various sub-channel registers 120-1, . . .

120-12 are strung together to form a T1 frame, with the two M/D sub-channel registers 120-1, 120-2 being separate from their B sub-channel register counterparts 120-3, . . . 120-12 (as the data channels are non-contiguous within a BR1/10 frame).

For the case of a fractional channel, which is the simplest channelization case, the network frame buffer 110 is programmed to provide a single data channel register consisting of up to the total number of data bits within the test frame. For testing DDS channelization, the network test frame buffer 110 is programmed to provide twenty-four, eight-bit channel registers, which directly correspond to the twenty-four DS0s of a T1 network frame, and each data channel register occupies eight contiguous bits within the test frame buffer. These twenty-four channels may be further divided into twenty-four primary and twenty-four secondary sub-channels. A data channel logic unit 130 is coupled to the BERT generator unit 100 and the frame buffer 110, and controls the replication of successive test frames for the implementation of DDS sub-rates.

To test a 3-DS0 ISDN channelization scheme, the network test frame buffer 110 is programmed to provide eight data channel registers, each consisting of two, eight-bit registers for the B1/B2 bearer sub-channels and one, two-bit register for the D sub-channel. The contents of the B1 and B2 bearer sub-channel registers occupy two successive DS0s within the stored T1 test frame, and the contents of the D sub-channel register are inserted into the middle two bit positions of the third DS0. The remaining 6 bits of the third DS0 (including the M-channel, the spare bits, and other utility bits) are generated on-the-fly by the data channel logic unit 130 and inserted into the 3-DS0 ISDN test frame.

The data channel-specific control logic unit 130 serves to control placing a test data channel generated by the BERT generator unit 100 into the network frame buffer 110 and extracting it from a bit stream returned from the network. As pointed out above, for the case of DDS channelization, the control logic unit 130 controls replication of frames to generate DDS sub-rates. It also generates the sub-rate framing patterns and control bits. On the receive side logic unit 130 decodes the DDS sub-rate framing patterns and control bits. For ISDN channelization, the control logic unit 130 inserts embedded operation channel (eoc) messages into each data channel and generates utility bits based on other data channel information. On the receive side, these utility bits are decoded and eoc messages are extracted for analysis downstream.

The contents of the data channel-specific registers 120 of the network frame buffer 110 are serially clocked through a transmit shift register 140 into an external network framer 150 under the control of a transmit data channel controller 160. The external framer 150 may comprise an integrated circuit that is separate from the FPGA of which most of the BERT generator's components are implemented. The external framer 150 is operative to take in a serial bit stream from the transmit shift register 140, and transmit that stream as a network signal (over the T1 link 170). Transmission frame synchronization is provided by way of a transmit frame synchronization control signal TX FRAME SYNC from the external network framer 150.

On the receive side of the (T1) network interface 170, the incoming network signal (namely, whatever is returned from the network circuit(s) under test) is converted into a serial bit stream, and along with a received frame synchronization signal RX FRAME SYNC, is fed by the external framer 150 into a receive shift register 200. The RX FRAME SYNC signal is used to identify the beginning of the frame within the receive shift register 200. The output of the receive shift register 200 is coupled to one or more receiver registers 230 that are programmed into a data channel-specific virtual receiver array 210, in accordance with the number of sub-channels within the data channel (two for DDS, three for ISDN, etc.). Namely, the virtual BERT receiver 210 functions as a virtual array of independent BERT receivers, one per data channel, being specific to the kind of data channels being used and is programmed to effectively match the BERT generator 100 on the transmit side, described above.

As data bits are received from the external framer 150, and are shifted out of the receive shift register 200, they are demultiplexed by a demultiplexer 220 back into the logical groupings of their originally transmitted sub-channels. A receive data channel controller 240 monitors the re-assembly of the recovered sub-channels out of the received serial bit stream and controls the operation of the virtual receiver 210. In particular, the receive data channel controller 240 controls the assembly of subchannels from the incoming serial bit stream, the processing of these bits through the virtual receiver array 210, and the storing of error counts and state information in memory 270/250. The receive data channel controller 240 essentially operates as a counter that counts from one up to the number of data channels present within the frame. It receives its timing from the external framer 150, so that it can properly extract data from each network frame.

For a fractional (non-channelized) test frame, the entire contents of the returned frame (or some fraction of it) are clocked through the receive shift register 200 and fed into the BERT receiver array 210 as a single data channel. For the case of DDS channelization, the contents of each DS0 (eight bits) are extracted as a respective channel. If a secondary DDS sub-channel is in use, those eight bits are further subdivided into the primary and secondary portions of the data channel. For 3-DS0 ISDN channelization, the B1 and B2 bits of each sub-channel are extracted from the first and second DS0s within each 3-DS0 group. The two D bits of each data sub-channel are extracted from the third DS0, along with the utility bits.

In the BR1/10 ISDN channelization scheme of FIG. 10, the D-bits for all of the (N=10) data channels are demultiplexed from the packed DS0s at the beginning of the test frame, and coupled into associated D pattern receiver registers 230-D of the virtual receiver array 210. The B1 and B2 sub-channel portions of each of the ten BR1/10 channels are demultiplexed from the successive DS0s and coupled into associated B1 and B2 receiver registers 230-B1 and 230-B2 for each of the (N=10) channels.

When all the bits of a particular channel are available, the data channel-specific BERT receiver 230 recalls state information stored in a data channel memory 250 for the data channel being processed. To check for bit errors in the frame sequence, the data channel bits stored in the BERT receiver registers 230 are serially fed into associated pattern comparators (not shown), which are also coupled to receive the test pattern codes produced by the BERT generator 100. Any bit errors are accumulated as error count totals in associated error count stores 260 of an error count memory 270. Memory 270 contains an array of memory locations for storing the count of bit errors for each data channel (1 through N). The error counts are stored under the control of the receive data channel controller 240 as the processing of each data channel is completed.

Once all the bits of a respective data channel have been processed, the state of that channel is saved in its associated memory 250. The cycle repeats for the next data channel until all data channels within the frame have been processed. Each error count memory location may store a count value read by an external device controller 300. The external device controller 300 is preferably implemented as a microcontroller, which supervises the operation of the FPGA and the external framer integrated circuit 150 and the processing of the accumulating error counts for each data channel. The external device controller 300 may be formed of a larger memory array than the FPGA, so that it is able to store larger bit error counts from lengthy (or error ridden) tests.

Also shown in FIG. 10 is an interrupt logic circuit 310, which is coupled to each of the transmit data channel controller 160, external framer 150 and receive data channel controller 240 and serves to signal the device controller 300 of specific events within the FPGA and the external framer. These events include transmit and receive frame sync events, bit error events, and pattern sync events.

As will be appreciated from the foregoing description, the shortcomings of conventional BERT schemes are effectively obviated by the programmably reconfigurable BERT system of the present invention, which is operative to emulate independent BERT generators for testing multiple channels of a telecommunication channel bank, in accordance with the types of channels and channelization of the circuits under test. Test frames of test pattern codes generated by the emulated independent BERT generators are conveyed to and returned from a channel bank under test by way of a serial communication link. Contents of subchannels of returned test frames are interfaced with data channel-specific virtual BERT receivers associated with respective digital communication channels, for analysis by an error processor, which derives a bit error rate (BER) for the multiple channels under test.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a digital communication network having a serial communication link over which time division multiplexed (TDM) digital communication signals are conveyable within a plurality of TDM time slots of a digital communication frame, said serial communication link being interfaced with digital communication circuits, a method of testing plural digital communication channels contained within said plurality of TDM time slots of said digital communication frame comprising the steps of:

(a) generating a sequence of test frames, each test frame containing a multiplicity of test pattern codes associated with respective ones of said plural digital communication channels within said plurality of TDM time slots of a digital communication frame; and (b) interfacing said sequence of test frames generated in step (a) with said digital communication units by means of said serial network interface and measuring performance of said digital communication circuits by processing frames returned over said serial network interface from said digital communication circuits.

2. A method according to claim 1, wherein said plural digital communication channels include different types of digital communication channels.

3. A method according to claim 1, wherein said plural digital communication channels include non-adjacent subchannels.

4. A method according to claim 1, wherein said plural digital communication channels include ISDN channel and DDS channels.

5. A method according to claim 1, wherein step (a) comprises providing an integrated circuit that is programmably configurable to simulate a plurality of bit error rate test (BERT) pattern generators, respective ones of which generate sequences of test pattern codes associated with different ones of said plural digital communication channels.

6. A method according to claim 1, wherein step (b) comprises looping back test pattern codes of said sequence of test frames generated in step (a) with digital communication ports of said digital communication circuits, and comparing received test pattern codes of said sequence of test frames with those applied to said communications circuits to provide measures of bit errors of said digital communication channels.

7. For use with a digital communication network having a serial communication link over which time division multiplexed (TDM) digital communication channels serving digital communication circuits are conveyable within a plurality of TDM time slots of a digital communication frame, said serial communication link being coupled to a plurality of digital communication circuits serving said digital communication circuits, an apparatus for testing said plurality of digital communication channels comprising:

a data channel-specific bit error rate test (BERT) generator that is programmably configurable to emulate a plurality of independent BERT generators associated with respective ones of said plurality of digital communication channels, each independent BERT pattern generator being operative to generate a respective test code pattern that is used to form a test frame for testing said plurality of digital communication channels; and a framing unit which is operative to assemble said respective test code patterns into said test frame and to transmit said test frame over said serial network interface to said plurality of digital communication circuits.

8. An apparatus according to claim 7, wherein said framing unit is operative to interface contents of test code patterns within test frames returned over said serial network interface from said plurality of digital communication circuits with a plurality of data channel-specific virtual BERT receivers associated with respective ones of said digital communication channels, and further including an error processor which is operative to determine errors in said contents of said test code patterns within said returned test frames.

9. An apparatus according to claim 7, wherein said framing unit comprises a data channel-specific network test frame buffer, which is programmably configurable to provide a plurality of sub-channel registers which store a test frame for transmission to said plurality of digital communication circuits.

10. An apparatus according to claim 7, wherein said data channel-specific BERT generator is programmably reconfigurable to emulate a plurality of independent BERT generators associated with different types of digital communication channels.

11. An apparatus according to claim 7, wherein said plural digital communication channels include non-adjacent sub-channels.

12. An apparatus according to claim 7, wherein said plural digital communication channels include ISDN and DDS channels.

13. An apparatus according to claim 7, wherein said framing unit is programmably reconfigurable to assemble said respective test code patterns into test frames associated with different channelization formats.

14. A bit error rate test (BERT) apparatus comprising:

an integrated circuit that is programmably reconfigurable to provide a plurality of virtual BERT generators associated with respective ones of a plurality of time division multiplexed (TDM) digital communication channels serving digital communication circuits, and conveyable within a plurality of TDM time slots of a digital communication frame over a serial communication link to a plurality of digital communication circuits associated with said digital communication circuits, each independent BERT pattern generator being operative to generate a respective test code pattern that is used to form a test frame for testing said plurality of digital communication channels, and a plurality of data channel-specific virtual BERT receivers associated with respective ones of said digital communication channels;

a framing unit which is operative to assemble said respective test code patterns into said test frame and to transmit said test frame over said serial network interface to said plurality of digital communication circuits, and to interface contents of test code patterns within test frames returned over said serial network interface from said plurality of digital communication circuits with said plurality of data channel-specific virtual BERT receivers; and an error processor which is operative to determine errors in said contents of said test code patterns within said returned test frames.

15. A BERT apparatus according to claim 14, wherein said framing unit comprises a data channel-specific network test frame buffer, which is programmably configurable to provide a plurality of sub-channel registers which store a test frame for transmission to said plurality of digital communication circuits.

16. A BERT apparatus according to claim 14, wherein said data channel-specific BERT generator is programmably reconfigurable to emulate a plurality of independent BERT generators associated with different types of digital communication channels.

17. A BERT apparatus according to claim 14, wherein said plural digital communication channels include non-adjacent sub-channels.

18. A BERT apparatus according to claim 14, wherein said plural digital communication channels comprise one of ISDN and DDS channels.

19. A BERT apparatus according to claim 14, wherein said framing unit is programmably reconfigurable to assemble said respective test code patterns into test frames associated with different channelization formats.

* * * * *